(12) United States Patent
Nagashima et al.

(10) Patent No.: US 7,040,307 B2
(45) Date of Patent: May 9, 2006

(54) SYSTEM FOR DIAGNOSING DEGRADATION OF AIR-FUEL SENSOR

(75) Inventors: Wataru Nagashima, Kariya (JP); Yukihiro Yamashita, Takahama (JP); Naoki Yoshiume, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/209,049

(22) Filed: Aug. 23, 2005

(65) Prior Publication Data

US 2006/0037305 A1    Feb. 23, 2006

(30) Foreign Application Priority Data

Aug. 23, 2004  (JP) ............................. 2004-242463

(51) Int. Cl.
*F02B 75/08* (2006.01)
*G01M 19/00* (2006.01)

(52) U.S. Cl. ................. 123/688; 701/103; 701/109; 73/118.1

(58) Field of Classification Search ................. 123/688, 123/443, 673, 674, 690, 696; 701/103, 109; 73/118.1
See application file for complete search history.

(56) References Cited

U.S. PATENT DOCUMENTS

| | | | | |
|---|---|---|---|---|
| 5,335,539 A | * | 8/1994 | Sweppy et al. ............ | 73/118.1 |
| 5,557,933 A | * | 9/1996 | Numata et al. ............. | 60/274 |
| 5,672,817 A | * | 9/1997 | Sagisaka et al. ........... | 73/118.1 |
| 5,724,952 A | | 3/1998 | Miyashita et al. .......... | 123/688 |
| 5,956,943 A | * | 9/1999 | Carnevale et al. .......... | 60/274 |
| 6,901,741 B1 | * | 6/2005 | Kobayashi et al. .......... | 60/274 |
| 2003/0000207 A1 | * | 1/2003 | Nakagawa et al. .......... | 60/285 |
| 2003/0192305 A1 | * | 10/2003 | Iihoshi et al. ............... | 60/277 |
| 2005/0072410 A1 | * | 4/2005 | Ohsaki ...................... | 123/674 |

FOREIGN PATENT DOCUMENTS

JP         4-311644      * 11/1992

* cited by examiner

*Primary Examiner*—Hai Huynh
(74) *Attorney, Agent, or Firm*—Nixon & Vanderhye P.C.

(57) ABSTRACT

An air-fuel ratio detected by an air-fuel ratio sensor is periodically varied by executing a PI control. During the PI control, a time period in which the detected air-fuel ratio passes through a predetermined rich-side range is defined as a rich-side time constant, and a time period in which the detected air fuel ratio passes through a predetermined lean-side range is defined as a lean-side time constant. A rich-side time delay represents a time period in which an air-fuel correction amount is increasingly corrected to exceed a rich-side threshold, and a lean-side time delay represents a time period in which the air-fuel correction amount is decreasingly corrected to exceed a lean-side threshold. These time constants and time delays are compared with a determining value to diagnose degradation of an air-fuel ratio sensor.

10 Claims, 12 Drawing Sheets

SYSTEM FOR DIAGNOSING DEGRADATION OF AIR-FUEL SENSOR

CROSS REFERENCE TO RELATED APPLICATIONS

This application is based on Japanese Patent Application No. 2004-242463 filed on Aug. 23, 2004, the disclosure of which is incorporated herein by reference.

FIELD OF THE INVENTION

The present invention relates to a system for diagnosing degradation of an air-fuel ratio sensor detecting an air-fuel ratio in an exhaust gas of an internal combustion engine.

BACKGROUND OF THE INVENTION

It is known that a vehicle is provided with an air-fuel ratio sensor that detects an air-fuel ratio of exhaust gas. The air-fuel ratio sensor is disposed upstream of a catalyst for purifying the exhaust gas. The signal detected by the air-fuel ratio senor is feed backed to enhance a purifying efficiency of the catalyst. In order to prevent a deterioration of the air-fuel ratio sensor, diagnosis of the air-fuel ratio sensor is conducted.

U.S. Pat. No. 5,724,952 shows such a diagnosis system in which a PI feedback control is conducted to periodically inverse a detected equivalence ratio of the air-fuel ratio sensor. The inversion period is compared with a degradation determining value to determine whether a response degradation of the air-fuel ratio sensor exists.

The response degradation of the air-fuel ratio sensor includes a time delay degradation and a time constant degradation. An exhaust emission is differently affected by the time delay degradation and the time constant degradation. However, in the diagnosis system shown in U.S. Pat. No. 5,724,952, the time delay degradation and the time constant degradation are not distinguished from each other to conduct the degradation diagnosis of the air-fuel ratio sensor. The degradation diagnosis is conducted based on the inversion period which varies with effects of the time delay degradation and the time constant degradation. Thus, the degradation of the air-fuel ratio sensor is hardly diagnosed accurately.

SUMMARY OF THE INVENTION

The present invention is made in view of the foregoing matter and it is an object of the present invention to provide a system for diagnosing a degradation of air-fuel ratio sensor which conduct a diagnosis of an air-fuel ratio sensor distinguishing effects between the time constant degradation and the time delay degradation.

According to a system for diagnosing degradation of an air-fuel ratio sensor disposed in an exhaust passage of an internal combustion engine of the present invention, the system includes a diagnosis air-fuel ratio control means for conducting a diagnosis air-fuel control in which an air-fuel ratio correcting amount is corrected in a direction away from a diagnosis target air-fuel ratio for diagnosis by a predetermined skip amount which is greater than a predetermined integral amount when a detected air fuel ratio is corrected toward the diagnosis target air-fuel ratio by the predetermined integral amount to exceed the diagnosis target air-fuel ratio. Furthermore, the system includes a time constant computing means for computing a time constant of the air-fuel ratio sensor based on the detected air-fuel ratio during the diagnosis air-fuel control. The system includes a time delay computing means for computing a time delay of the air-fuel ratio sensor based on the detected air-fuel ratio during the diagnosis air-fuel control. The system includes a diagnosis means for diagnosing at least one of a rich-side time constant degradation, a lean-side time constant degradation, a rich-side time delay degradation, and a lean-side time delay degradation of the air-fuel ratio sensor based on a time constant information computed by the time constant computing means and a time delay information computed by the time delay computing means.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

An embodiment of the present invention will be described hereinafter with reference to the drawings.

Figure 1:
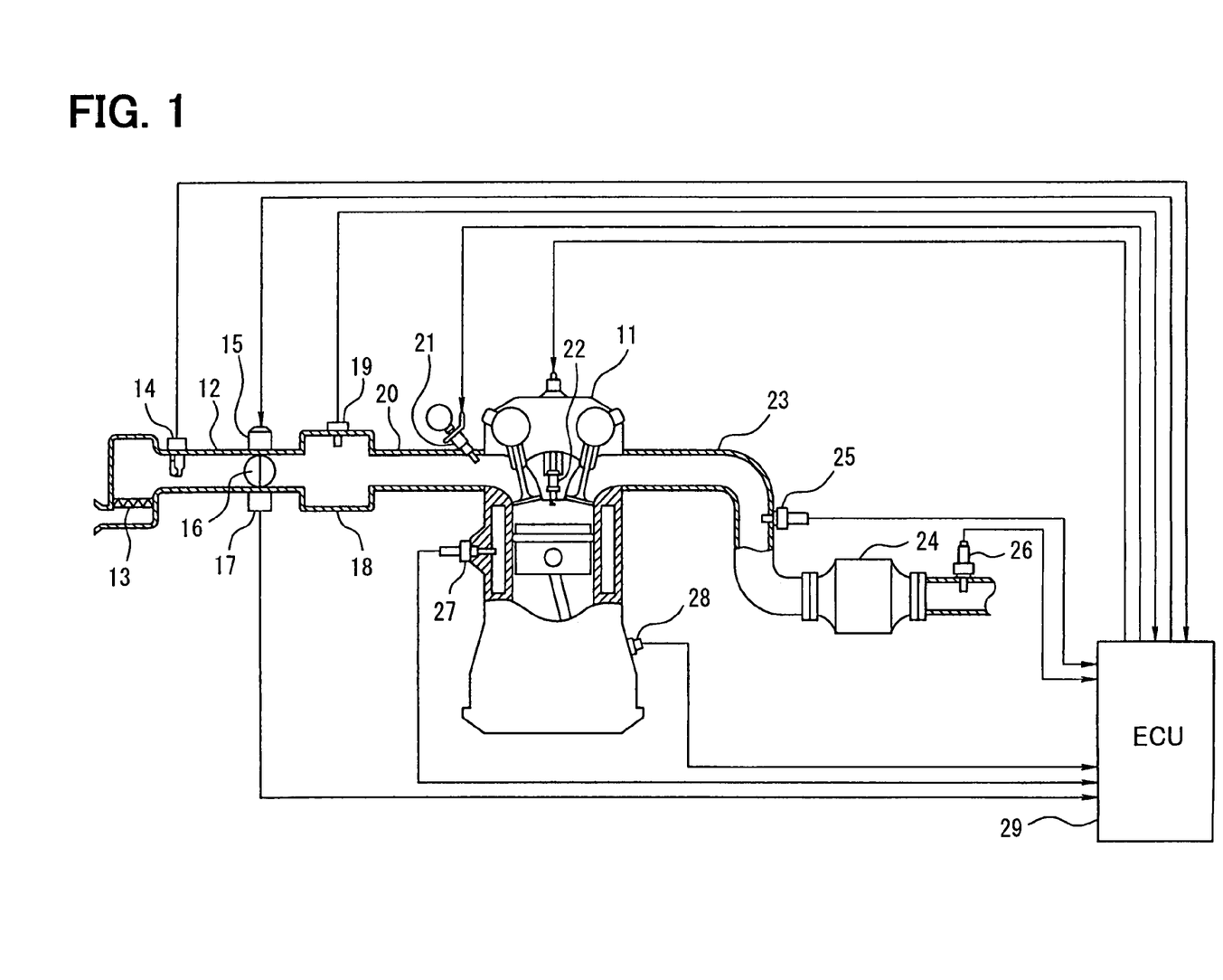
FIG. 1 is a schematic view of the engine control system.

Referring to FIG. 1, a structure of an engine control system is described hereinafter. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor detecting a throttle position are provided downstream of the air flow meter 14.

A surge tank 18 including an intake air pressure sensor 19 is provided down steam of the throttle valve 16. The intake air pressure sensor 19 detects intake air pressure. An intake manifold 20 is connected to the surge tank 18. A fuel injector 21 is mounted on the intake manifold 20 at a vicinity of an intake air port. A spark plug is mounted on a cylinder head of the engine 11 corresponding to each cylinder to ignite air-fuel mixture in each cylinder.

An exhaust pipe 23 of the engine 11 is provided with a three-way catalyst 24 purifying CO, HC, NOx in the exhaust gas. An air-fuel sensor 25 disposed upstream of the three-way catalyst 24 detects air-fuel ratio of the exhaust gas. An oxygen sensor 26 disposed downstream the three-way catalyst 24 detects rich/lean of the exhaust gas.

A coolant temperature sensor 27 detecting a coolant temperature and a crank angle senor 28 outputting a pulse signal every predetermined crank angle of a crankshaft of the engine 11 are disposed on a cylinder block of the engine 11. The crank angle and an engine speed are detected based on the output signal of the crank angle sensor 28.

The outputs from the above sensors are inputted into an electronic control unit 29, which is referred to an ECU hereinafter. The ECU 29 includes a microcomputer which executes an engine control program stored in a ROM (Read Only Memory) to control a fuel injection amount and an ignition timing according to an engine running condition.

The ECU 29 executes an air-fuel ratio feedback control program. When a predetermined air-fuel feedback control execute condition is established, a regular air-fuel ratio control is executed to compute an air-fuel correction amount so that a detected air fuel ratio is brought into consistent with a target air-fuel ratio. During the regular air-fuel ratio control, the target air-fuel ratio is corrected is such a manner that the air-fuel ratio of the exhaust gas is within a purifying window of the catalyst 24, such as a stoichiometric ratio or a vicinity thereof based on the output signal of the oxygen sensor 26.

The ECU 29 executes each program shown in FIGS. 6 to 12 to diagnose a degradation of the air-fuel sensor 25 as described below.

Figure 2:
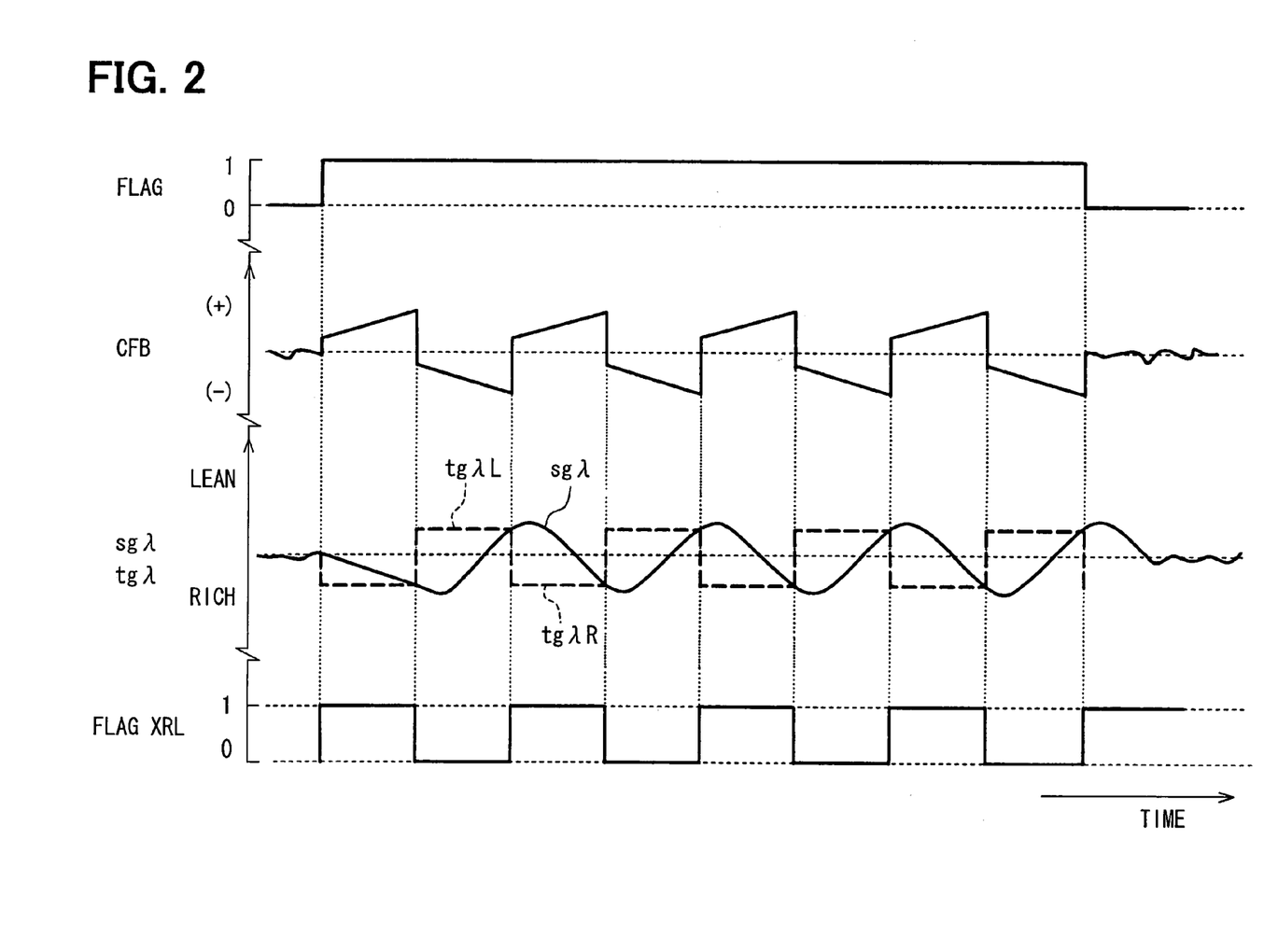
FIG. 2 is a time chart for explaining a PI control.

When a predetermined diagnosing condition is established, the computer executes a PI control (air-fuel control for diagnosing the degradation). As shown in FIG. 2, when an air-fuel ratio "sgλ" detected by the air-fuel ratio sensor 25 becomes richer than a rich-side target air-fuel ratio "tgλR", the target air-fuel ratio for diagnosing degradation is turned into a lean-side target air fuel ratio "tgλL". When the detected air-fuel ratio "sgλ" becomes leaner than the lean-side target air fuel ratio "tgλL", the target air-fuel ratio for diagnosing degradation is turned into the rich-side target air-fuel ratio "tgλR".

While the detected air-fuel ratio "sgλ" is leaner than the rich-side target air-fuel ratio "tgλR", an air-fuel ratio correction amount CFB is increased in steps of an integral amount KICFB. When the detected air-fuel ratio "sgλ" becomes richer than the rich-side target air fuel ratio "tgλR", the air-fuel ratio correction amount CFB is decreased by a skip amount KPCFB. While the detected air-fuel ratio "sgλ" is richer than the lean-side target air-fuel ratio "tgλL", an air-fuel ratio correction amount CFB is decreased in steps of an integral amount KICFB. When the detected air-fuel ratio "sgλ" becomes leaner than the lean-side target air fuel ratio "tgλL", the air-fuel ratio correction amount CFB is increases by the skip amount KPCFB.

The skip amount KPCFB is set up as a value which is larger than the integral amount KICFB. A variation rate of the air-fuel ratio correction amount CFB corrected by the skip amount KPCFB is larger than a variation rate of the target air-fuel ratio for diagnosing degradation which is turned between the rich-side target air fuel ratio "tgλR" and the lean-side target air-fuel ratio "tgλL". During the PI control, an inversion period "ct" of the air-fuel correction amount CFB (an inversion period of output of the air-fuel ratio sensor 25), a time constant "res" of the air-fuel ratio sensor 25, and a time delay "dt" of the air-fuel ratio sensor 25 are detected as following description.

Figure 3:
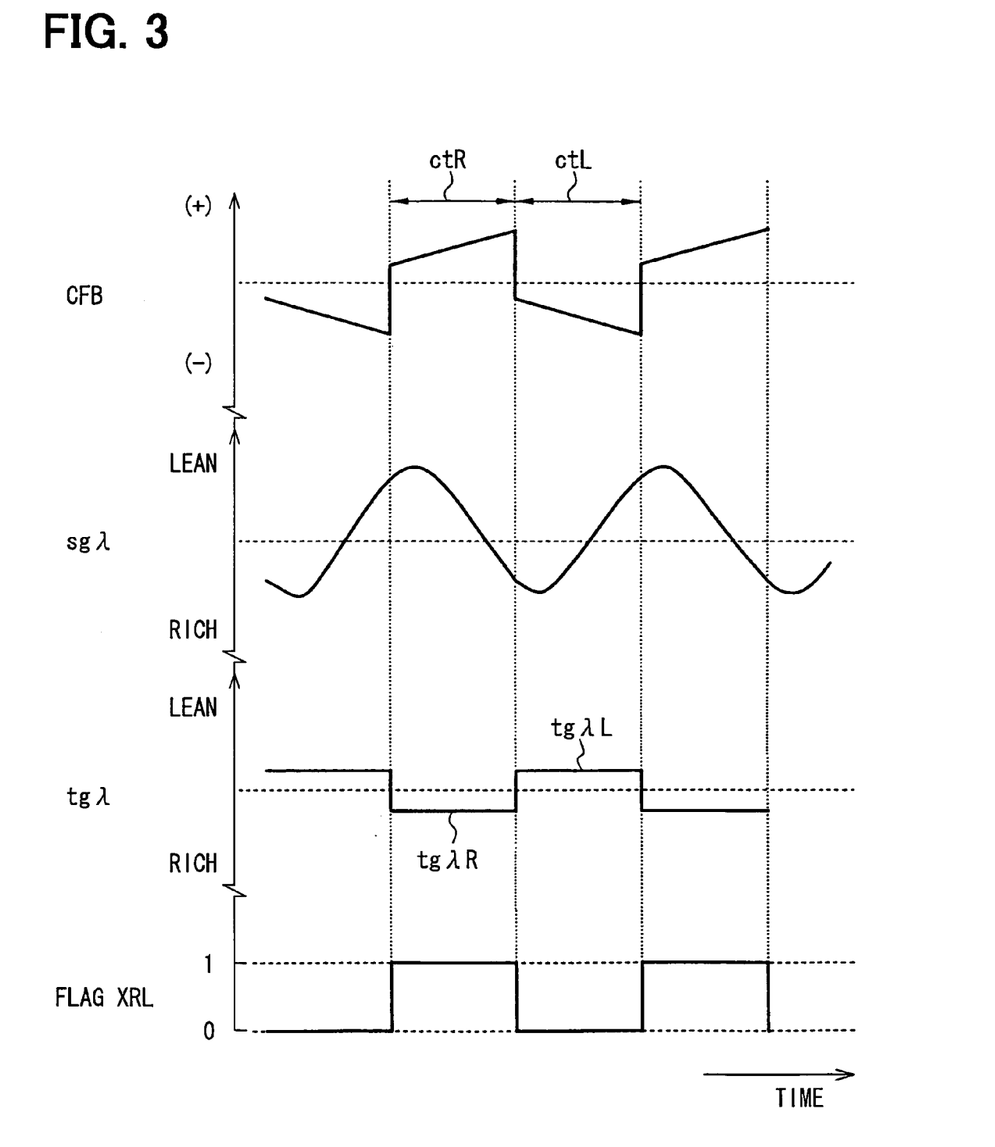
FIG. 3 is a time chart for explaining a computation of an inversion period.

As shown in FIG. 3, a period from a time when the air-fuel correction amount CFB is increased by the skip amount KPCFB to a time when the air-fuel correction amount CFB is decreased by the skip amount KPCFB is defined as a rich inversion period "ctR". A period from a time when the air-fuel correction amount CFB is decreased by the skip amount KPCFB to a time when the air-fuel correction amount CFB is increased by the skip amount KPCFB is defined as a lean inversion period "ctL".

Figure 4:
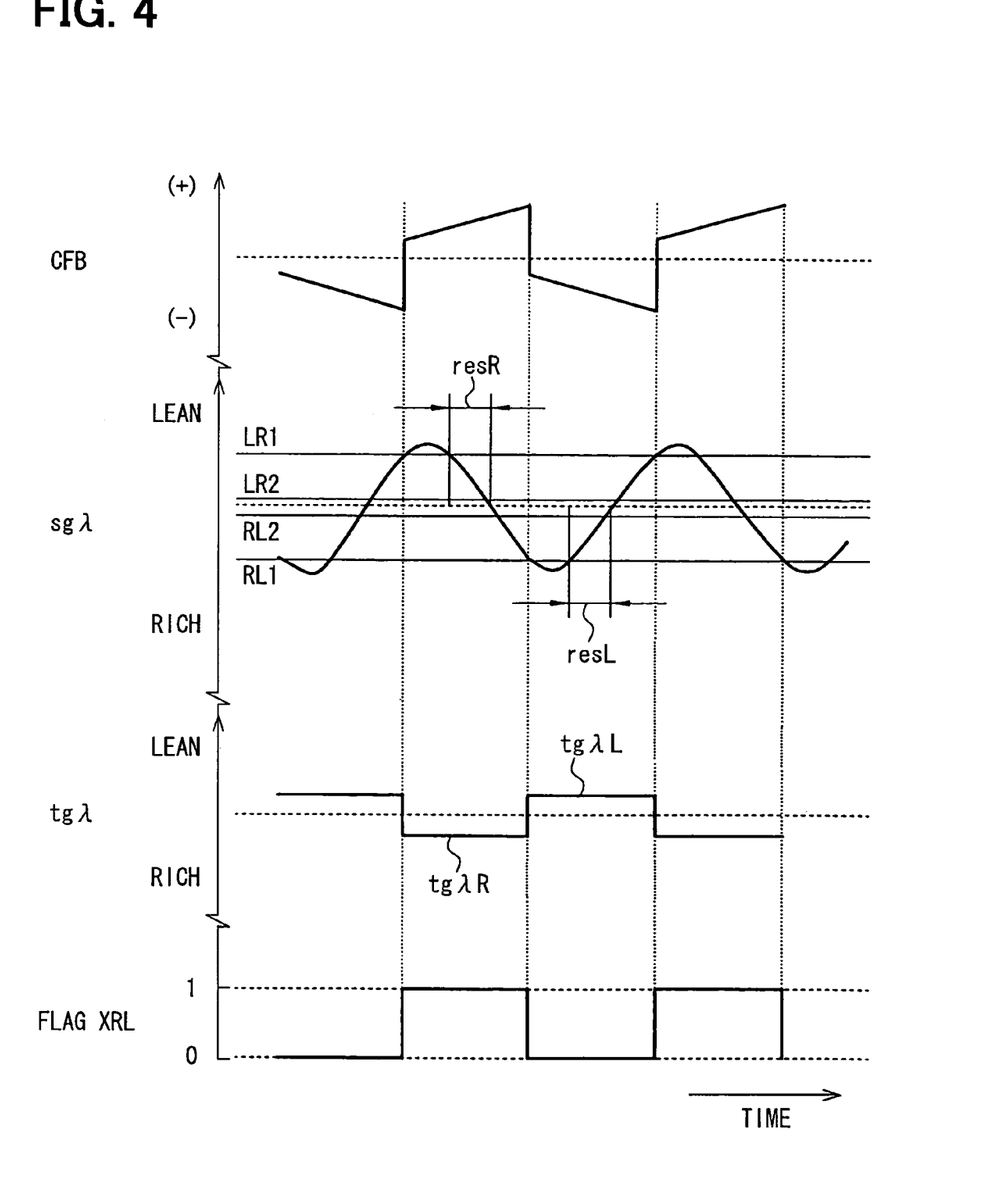
FIG. 4 is a time chart for explaining a computation of a time constant.

As shown in FIG. 4, a time period in which the detected air-fuel ratio "sgλ" needs to pass through a predetermined rich-side range (from a rich-side threshold LR1 to a rich-side threshold LR2) is defined as rich-side time constant "resR", and a time period in which the detected air-fuel ratio "sgλ" needs to pass through a predetermined lean-side range (from a lean-side threshold RL1 to a lean-side threshold RL2) is defined as lean-side time constant "resL". The predetermined rich-side range and the predetermined lean-side range are respectively established in a range which is hardly affected by the time delay of the air-fuel ratio sensor 25, for example, a range exceeding an extremal value of the detected air-fuel ratio "sgλ".

Figure 5:
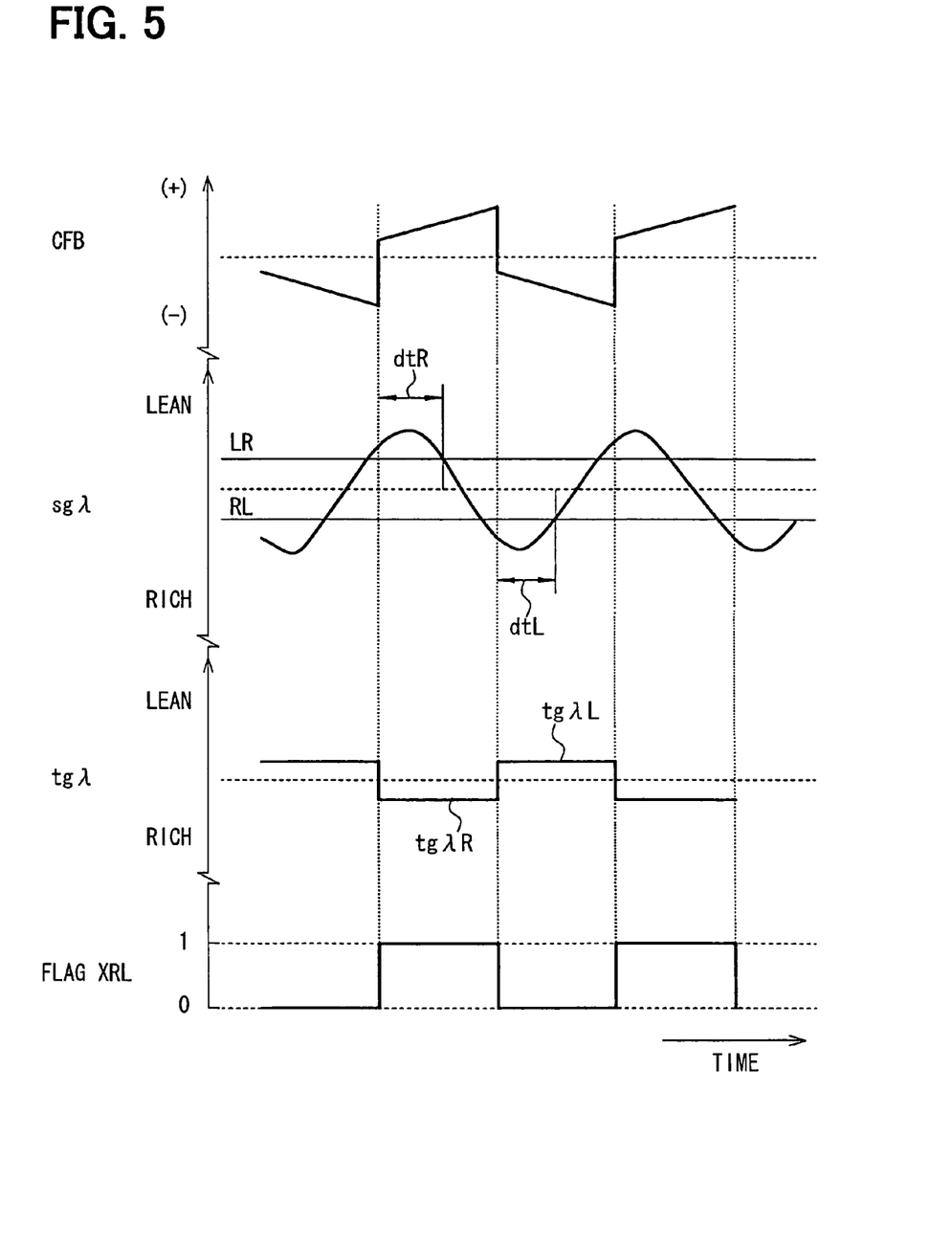
FIG. 5 is a time chart for explaining a computation of a time delay.

As shown in FIG. 5, a time period from a time when the air-fuel correction amount CFB is increased by the skip amount KPCFB to a time when the detected air-fuel ratio "sgλ" exceeds the rich-side threshold LR is defined as a rich-side time delay "dtR". A time period from a time when the air-fuel correction amount CFB is increased by the skip amount KPCFB to a time when the detected air fuel ratio "sgλ" exceeds the lean-side threshold LR is defined as a lean-side time delay "dtL". The rich-side threshold LR is set up as a value which is richer than the lean-side extremal value of the detected air-fuel ratio "sgλ". The lean-side threshold RL is set up to a value which is leaner than the rich-side extremal value of the detected air-fuel ratio "sgλ".

The diagnosis of the air-fuel ratio sensor 25 is conducted after the inversion period "ct", the time constant "res", and the time delay "dt" are detected. At first, a summation of the rich inversion period "ctR" and the lean inversion period "ctL" is compared with a degradation determining value "Kct". When the summation is larger than the degradation determining value "Kct", the computer determines that the inversion period of the output of the air-fuel ratio sensor 25 has degradation.

The rich-side time constant "resR" is compared with a degradation determining value "KresR1", and the lean-side time constant "resL" is compared with a degradation determining value "KresL1". When the rich-side time constant "resR" is larger than the degradation determining value "KresR1", the computer determines that the rich-side time constant of the air-fuel ratio sensor 25 has degradation. When the rich-side time constant "resL" is larger than the degradation determining value "LresL1", the computer determines that the lean-side time constant of the air-fuel sensor 25 has degradation.

The rich-side time delay "dtR" is compared with a degradation determining value "KdtR", and the lean-side time delay "dtL" is compared with a degradation determining value "KdtL". When the rich-side time delay "dtR" is larger than the degradation determining value "KdtR", the computer determines that the rich-side time delay of the air-fuel ratio sensor 25 has degradation. When the lean-side time delay "dtL" is larger than the degradation determining value "KdtL", the computer determines that the lean-side time delay of the air-fuel ratio sensor 25 has degradation. When the rich-side time constant "resR" is larger than the determining value "KresR2" and the lean-side time constant "resL" is larger than the determining value "KresL2", the computer determines that the rich-side time delay "dtR" and the lean-side time delay "dtL" exceed the degradation determining value and that the air-fuel ratio sensor 25 has no degradation. The determining values "KresR2" and "KresL2" are respectively set to values which are smaller than the degradation determining value "KresR1" and "KresR2".

When the computer determines that the air-fuel ratio sensor has the degradation, a degradation flag is turned on to alert a driver by tuning on an warning lump on an instrument panel and the degradation information (degradation code) are stored in a nonvolatile memory such as backup RAM (not shown) of the ECU 29.

During the PI control, the ECU 29 corrects the target air-fuel ratio for diagnosing the degradation based on the output of the oxygen sensor 26 in such a manner that the air-fuel ratio of the exhaust gas is within the purifying window of the catalyst 24, such as the stoichiometric ratio or the vicinity thereof.

The diagnosis of the air-fuel ratio sensor 25 described above is conducted by the ECU 29 according to each program shown in FIGS. 6 to 12.

[Diagnosing Degradation of Air-Fuel Ratio Sensor]

Figure 6:
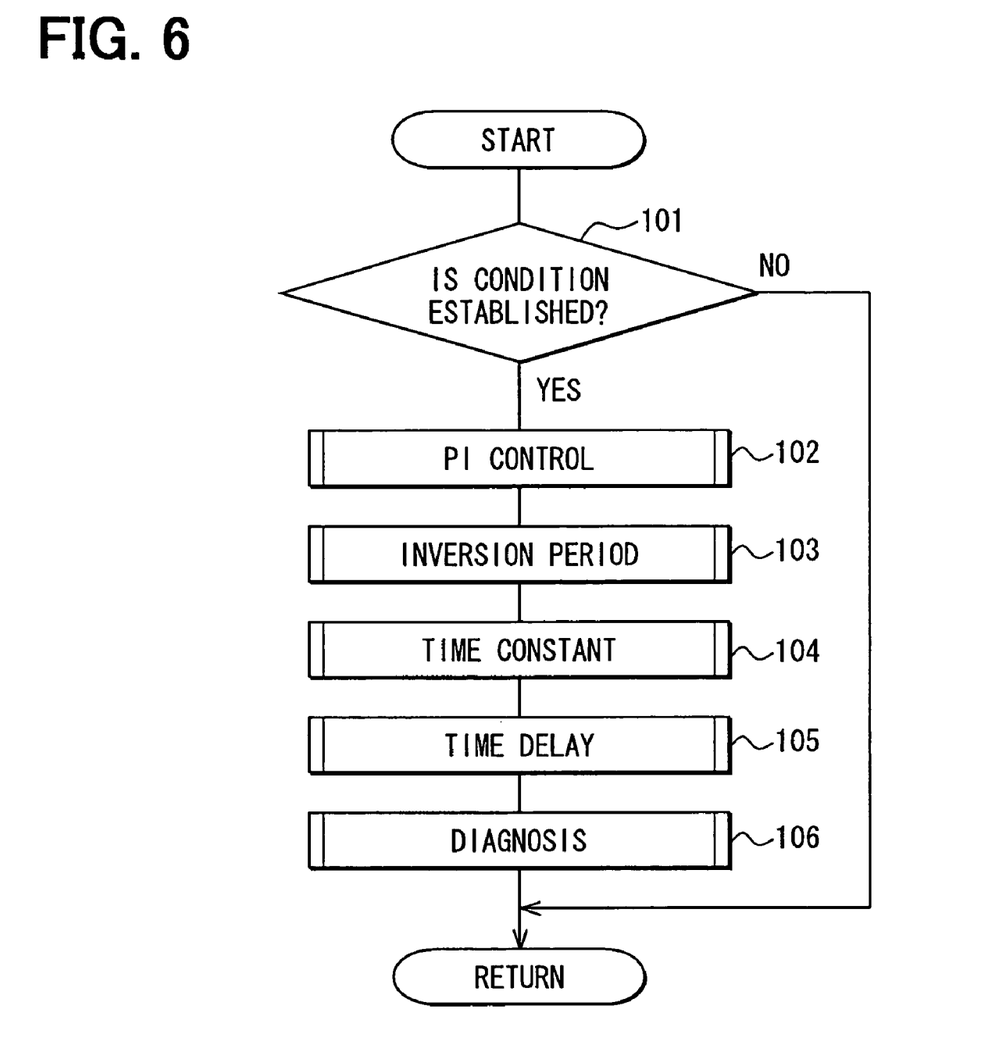
FIG. 6 is a flowchart showing a main program for air-fuel sensor degradation diagnosis.

A main program shown in FIG. 6 is executed every predetermined period (for example, a period of 5 microseconds). In step 101, a determination is made as to whether a diagnosis execution condition is established. The diagnosis execution condition is that the engine speed is within a predetermined range, a coolant temperature is higher than a predetermined value, the air-fuel sensor 25 is activated, and diagnosis is not conducted during driving cycle.

When the diagnosis execution condition is not established, the procedure ends without executing following steps including step 102.

Figure 7:
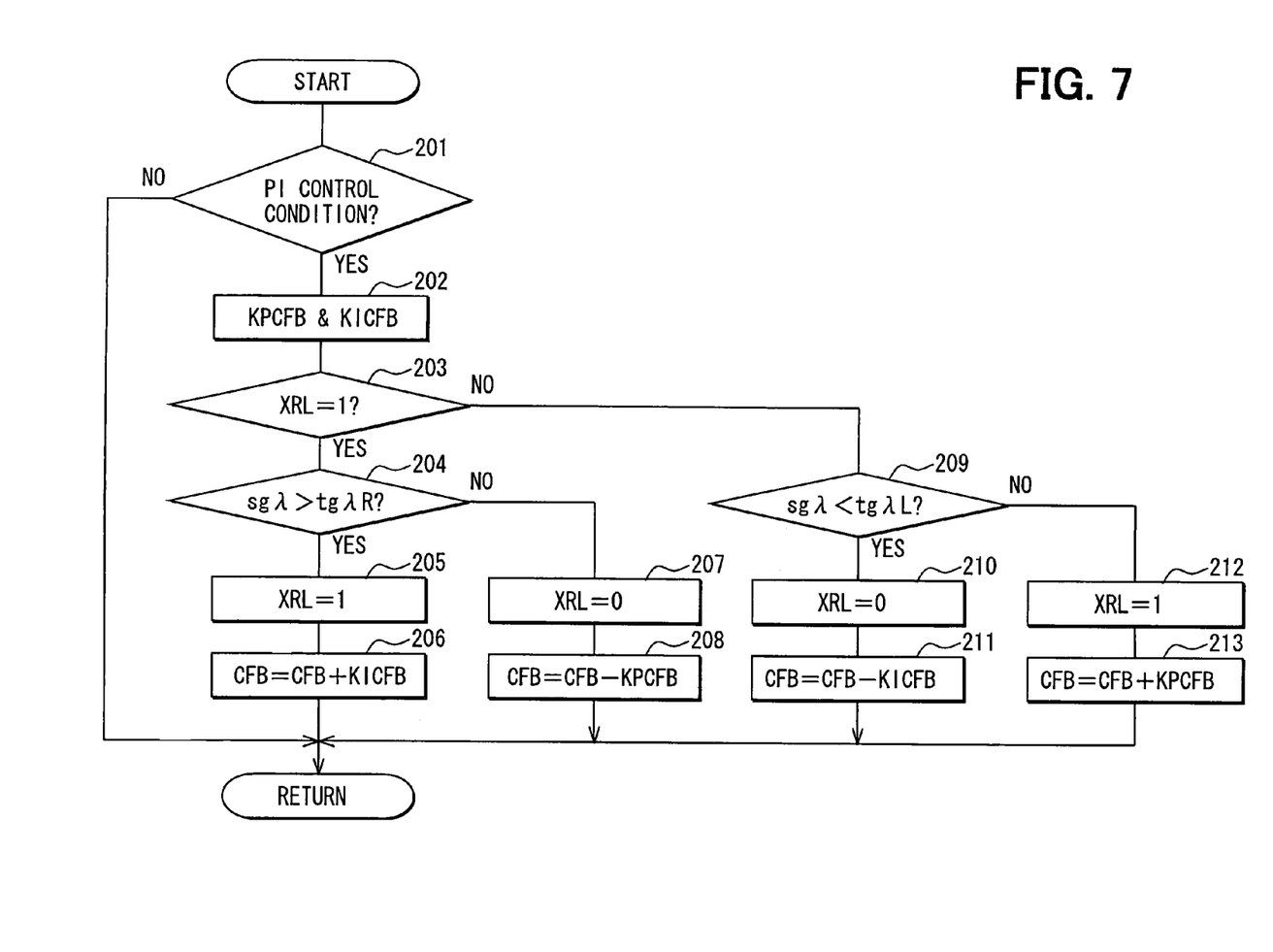
FIG. 7 is a flowchart showing a PI control program.

When the answer is Yes in step 101, the procedure proceeds to step 102 in which the detected air-fuel ratio "sgλλ" is periodically varied by executing a PI control program shown in FIG. 7.

Figure 8:
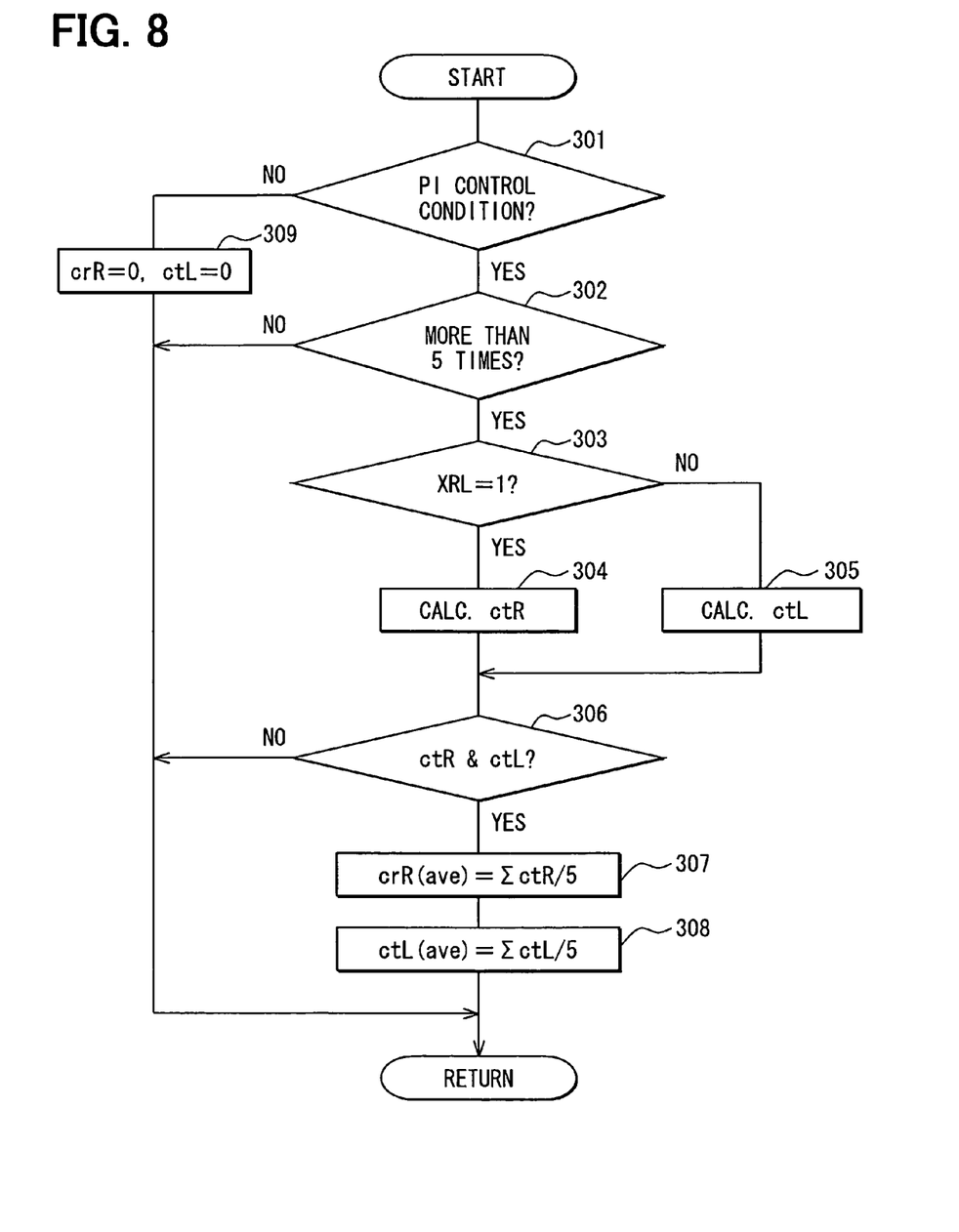
FIG. 8 is a flowchart showing an inversion period computing program.

In step 103, the rich inversion period "ctR" and the lean inversion period "ctL" are computed by executing a program shown in FIG. 8. In step 104, the rich-side time constant "resR" and the lean-side time constant "resL" are computed by executing a program shown in FIG. 9. In step 105, the rich-side time delay "dtR" and the lean-side time delay "dtL" are computed by executing a program shown in FIG. 10.

Then, the procedure proceeds to step 106 in which the diagnosis of the air-fuel ratio sensor 25 is conducted based on the rich inversion period "ctR", the lean inversion period "ctL", the rich-side time constant "resR", the lean-side time constant "resL", the rich-side time delay "dtR", and the lean-side time delay "dtL".

[PI Control]

A Pi control program shown in FIG. 7 is a subroutine, which is executed in step 102 of the main program shown in FIG. 6. This PI control program corresponds to an air-fuel ratio control means in the present invention.

In step 201, a determination is made as to whether a PI control execution condition is established. The PI control execution condition is the same as the diagnosis execution condition. When the Pi control condition is not established, the program ends.

When the answer is Yes in step 201, the procedure proceeds to step 202 in which the skip amount KPCFB corresponding to the engine speed and the intake air flow rate are computed according to maps or mathematical formulas. The skip amount KPCFB is set to a value which is larger than the integral amount KICFB. A variation rate of the air-fuel ratio correction amount CFB corrected by the skip amount KPCFB is larger than a variation rate of the target air-fuel ratio for diagnosing degradation which is turned between the rich-side target air fuel ratio "tgλR" and the lean-side target air-fuel ratio "tgλL".

In step 203, a determination is made as to whether the current target air-fuel ratio is in the rich-side target air-fuel ratio "tgλR" based on whether a rich/lean flag XRL is set to "1".

When the answer is Yes in step 203, the procedure proceeds to step 204 in which a determination is made as to whether the detected air-fuel ratio "sgλ" is leaner than the rich-side target air-fuel ratio "tgλR".

When the detected air-fuel ratio "sgλ" is leaner than the rich-side target air-fuel ratio "tgλR", the procedure proceeds to step 205 in which the flag XRL is maintained at "1" and the target air-fuel ratio is kept as the rich-side target air-fuel ratio "tgλR". Then, the procedure proceeds to step 206 in which the air-fuel ratio correction amount CFB is increased by the integral amount KICFB.

$$CFB = CFB + KICFB$$

When the answer is No in step 204, the procedure proceeds to step 207 in which the flag XRL is reset to "0" and the target air-fuel ratio is turned into the lean-side target air-fuel ratio "tgλL". Then, the procedure proceeds to step 208 in which the target air-fuel ratio correction CFB is decreased by the skip amount KPCFB.

$$FB = CFB - KICFB$$

When the computer determines that the flag has been reset to "0" in step 203, the procedure proceeds to step 209 in which a determination is made as to whether the detected air-fuel ratio sgλ is richer than the lean-side target air-fuel ratio "tgλL".

When the answer is Yes in step 209, the procedure proceeds to step 209 in which the flag XRL is set to "0" and the target air-fuel ratio is kept as the lean-side target air-fuel ratio "tgλL". And then, the procedure proceeds to step 211 in which the air-fuel correction amount CFB is decreased by the integral amount KICFB.

$$CFB = CFB - KICFB$$

When the answer is No in step 209, the procedure proceeds to step 212 in which the flag is set to "1" and the target air-fuel ratio is turned into the rich-side target air-fuel ratio "tgλR". And then, the procedure proceeds to step 213 in which the air-fuel correction amount CFB is increased by the skip amount KPCFB.

$$CFB = CFB + KPCFB$$

[Computation of Inversion Period]

A program shown in FIG. 8 is a subroutine which is executed in step 103 of FIG. 6. This program corresponds to an inversion period detecting means in the present invention.

In step 301, a determination is made as to whether a PI control execution condition is established. When the PI control execution condition is not established in step 301, the procedure proceeds to step 309 in which the rich inversion period "ctR" and the lean inversion period "ctL" are reset to "0", and then the program ends.

When the answer is Yes in step 301, the procedure proceeds to step 302 in which a determination is made as to whether target air-fuel ratio is inverted more than predetermined times (for example, five times). When the answer is Yes in step 302, the procedure proceeds to step 303 in which a determination is made as to whether the flag XRL is set to "1".

When the answer is Yes in step 303, the procedure proceeds to step 304 in which a counter is incremented from a time when the flag is set to "1" until a time when the flag is reset to "0" in order to measure a time period from a time when the air-fuel correction amount CFB is increased by the skip amount KPCFB to a time when the air-fuel correction amount CFB is decreased by the skip amount KPCFB. This measured period is defined as the rich inversion period "ctR".

When the answer is No in step 303, the procedure proceeds to step 305 in which a counter is incremented from a time when the flag is reset to "0" until a time when the flag is set to "1" in order to measure a time period from a time when the air-fuel correction amount CFB is decreased by the skip amount KPCFB to a time when the air-fuel correction amount CFB is increased by the skip amount KPCFB. This measured period is defined as the lean inversion period "ctL".

Then, the procedure proceeds to step 306 in which a determination is made as to whether the rich inversion period "ctR" and the lean inversion period "ctL" are respectively inverted more than a predetermined times (for example, five times). When the determination is made that the rich inversion period "ctR" and the lean inversion period "ctL" are respectively inverted the predetermined times, the procedure proceeds to step 307 in which an average "ctR (ave)" of the rich inversion period "ctR" per the predetermined times is computed. And then, the procedure proceeds to step 308 in which an average "ctL (ave)" of the lean inversion period "ctL" per the predetermined times is computed.

[Computation of Time Constant]

Figure 9:
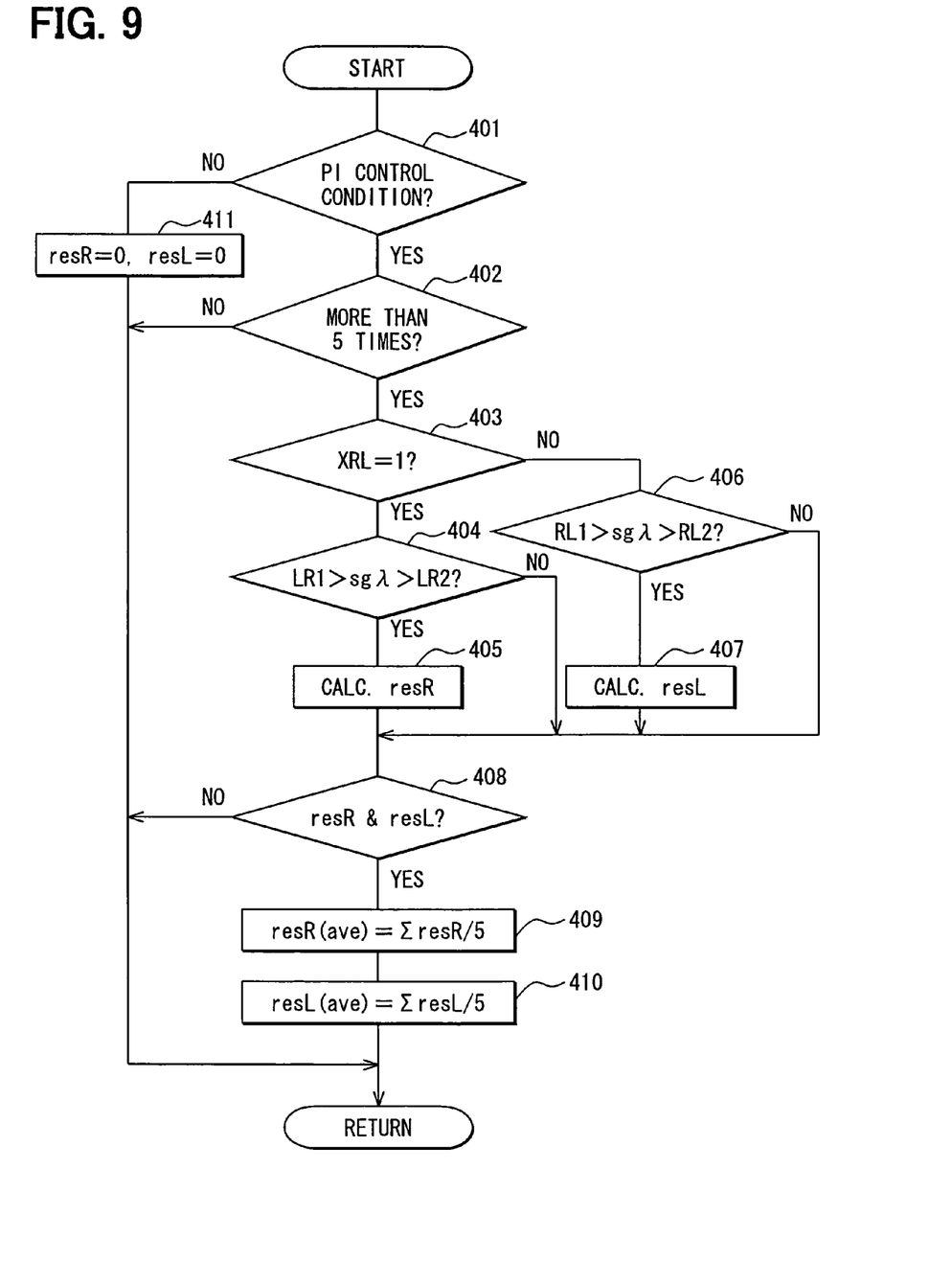
FIG. 9 is a flowchart showing a time constant computing program.

A program shown in FIG. 9 is a subroutine which is executed in step 104 of the main program shown in FIG. 6. This program corresponds to a time constant computing means.

In step 401, a determination is made as to whether a P1 control execution condition is established. When the PI control execution condition is not established in step 401, the procedure proceeds to step 411 in which the rich-side time constant "resR" and the lean-side time constant "resL" are reset to "0", and then the program ends.

When the answer is Yes in step 401, the procedure proceeds to step 402 in which a determination is made as to whether target air-fuel ratio is inverted more than predetermined times (for example, five times). When the answer is Yes in step 402, the procedure proceeds to step 403 in which a determination is made as to whether the flag XRL is set to "1".

When the answer is Yes in step 403, the procedure proceeds to step 404 in which a determination is made as to whether the detected air-fuel ratio "sgλ" is within a predetermined rich-side range (LR1>sgλ>LR2). When the answer is Yes in step 404, the procedure proceeds to step 405 in which the counter is incremented to measure a time period in which the detected air-fuel ratio "sgλ" passes through the rich-side range (from the rich-side threshold LR1 to the rich-side threshold LR2). This time period is defined as the rich-side time constant "resR".

When the answer is No in step 403, the procedure proceeds to step 406 in which a determination is made as to whether the detected air-fuel ratio "sgλ" is within a predetermined lean-side range (RL1<sgλ<RL2). When the answer is Yes in step 406, the procedure proceeds to step 407 in which the counter is incremented to measure a time period in which the detected air-fuel ratio "sgλ" passes through the lean-side range (from the lean-side threshold RL1 to the lean-side threshold RL2). This time period is defined as the lean-side time constant "resL".

The rich-side range (LR1 to LR2) and the lean-side range (RL1 to RL2) are set to ranges which are hardly affected by the time delay of the air-fuel ratio sensor 25, for example, a range exceeding an extremal value of the detected air-fuel ratio sgλ. Besides, it may be that LR2=RL2=(LR1+RL1)/2.

Then, procedure proceeds to step 408 in which a determination is made as to whether the rich-side time constant "resR" and the lean-side time constant "resL" are respectively detected more than a predetermined times (for example, five times). When the answer is Yes in step 408, the procedure proceeds to step 409 in which an average "resR (ave)" of the rich-side time constant "resR" per a predetermined times is computed. And then, the procedure proceeds to step 410 in which an average "resL (ave)" of the lean-side time constant "resL" per the predetermined times is computed.

[Computation of Time Delay]

Figure 10:
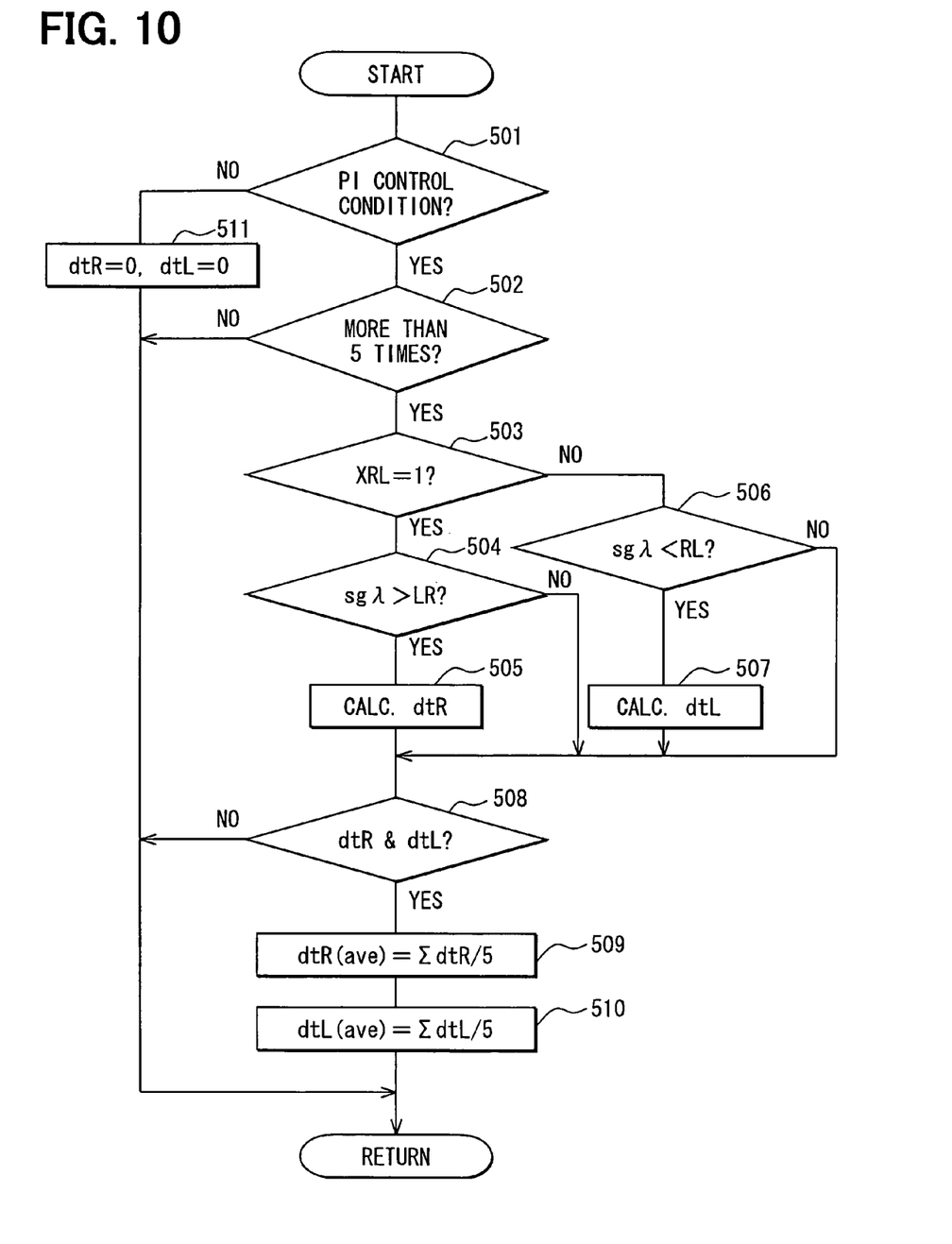
FIG. 10 is a flowchart showing a time delay computing program.

A program shown in FIG. 10 is a subroutine which is executed in step 105 of the main program shown in FIG. 6.

In step 501, a determination is made as to whether a P1 control execution condition is established. When the P1 control execution condition is not established in step 501, the procedure proceeds to step 511 in which the rich-side time delay "dtR" and the lean-side time delay "dtL" are reset to "0", and then the program ends.

When the answer is Yes in step 501, the procedure proceeds to step 502 in which a determination is made as to whether target air-fuel ratio is inverted more than predetermined times (for example, five times). When the answer is Yes in step 502, the procedure proceeds to step 503 in which a determination is made as to whether the flag XRL is set to "1".

When the answer is Yes in step 503, the procedure proceeds to step 504 in which a determination is made as to whether the detected air-fuel ratio "sgλ" is leaner than the rich-side threshold LP. When the answer is Yes instep 504, the procedure proceeds to step 505 in which a counter is incremented in order to measure a time period from a time when the air-fuel correction amount CFB is increased by the skip amount KPCFB to a time when the detected air-fuel ratio "sgλ" exceeds the rich-side threshold LR. This measured period is defined as the rich-side time delay "dtR".

When the answer is No in step 503, the procedure proceeds to step 506 in which a determination is made as to whether the detected air-fuel ratio "sgλ" is richer than the lean-side threshold RL. When the answer is Yes in step 506, the procedure proceeds to step 507 in which a counter is incremented in order to measure a time period from a time when the air-fuel correction amount CFB is decreased by the skip amount KPCFB to a time when the detected air-fuel ratio "sgλ" exceeds the lean-side threshold RL. This measured period is defined as the lean-side time delay "dtL".

The rich-side threshold LR is set to a value which is richer than a lean-side extremal value of the detected air fuel ratio "sgλ", and the lean-side threshold RL is set to a value which is leaner than a rich-side extremal value of the detected air fuel ratio "sgλ". The rich-side threshold LR and the lean-side threshold RL for detecting the time delay may be set to the same value of the rich-side threshold LR1 and the lean-side threshold RL1 for detecting the time constant (LR=LR1, RL=RL1).

Then, the procedure proceeds to step 508 in which a determination is made as to whether the rich-side time delay "dtR" and the lean-side time delay "dtL" are respectively detected a predetermined times (for example, five times). When the answer is Yes in step 508, the procedure proceeds to step 509 in which an average "dtR (ave)" of the rich-side time delay "dtR" per a predetermined times is computed. And then, the procedure proceeds to step 510 in which an average "dtL (ave)" of the lean-side time delay "dtL" per a predetermined times is computed.

[Diagnosis of Degradation]

Figure 11:
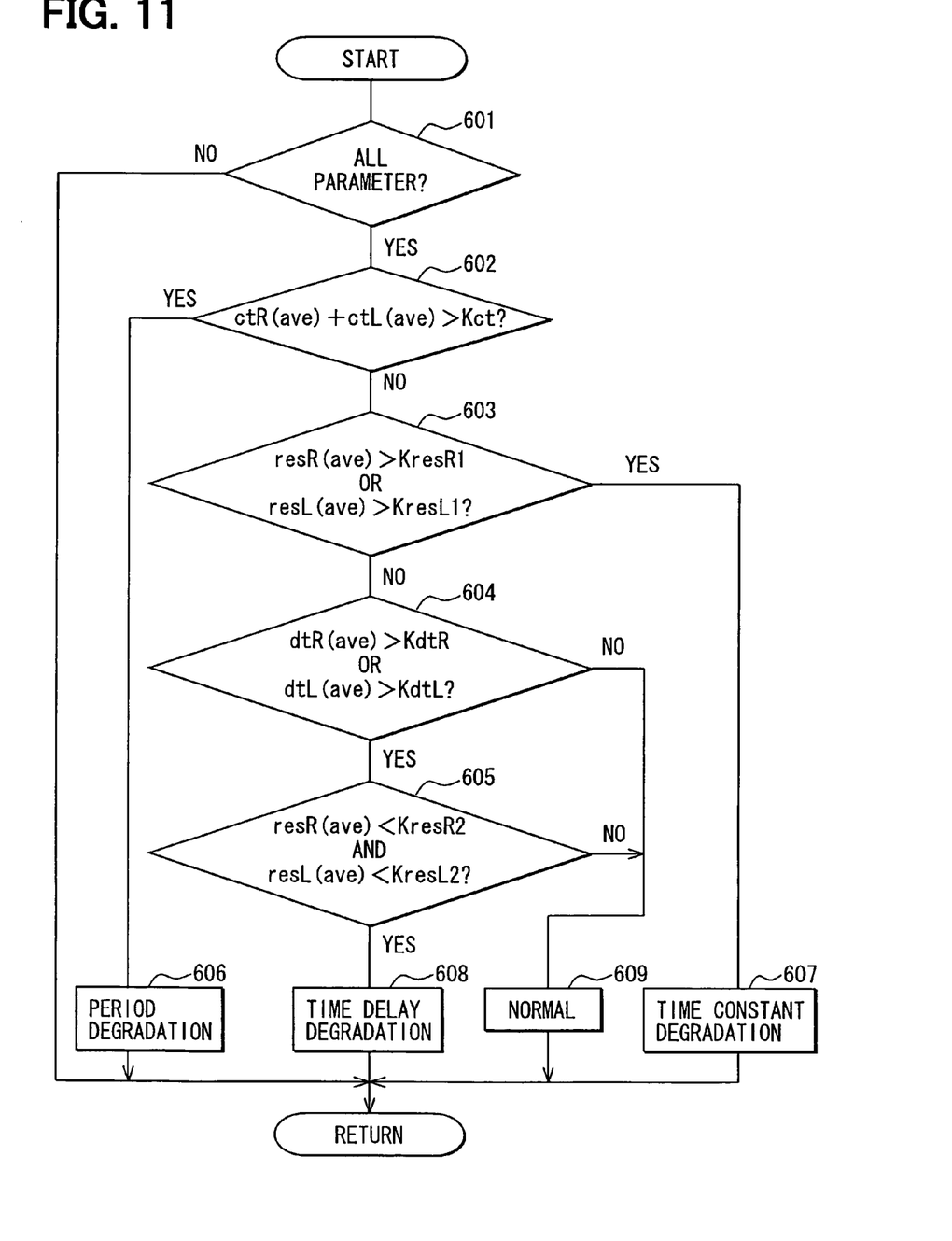
FIG. 11 is a flowchart showing a degradation diagnosis program.

A program shown in FIG. 11 is a subroutine which is executed in step 106 of the main program shown n FIG. 6. In step 601, a determination is made as to whether all of the parameters for diagnosis, specifically the average rich inversion period "ctR (ave)", the average lean inversion period "ctL (ave)", the average rich-side time constant "resR (ave)", the average lean-side time constant "resL (ave)", the average rich-side time delay "dtR (ave)", and the average lean-side time delay "dtL (ave)" are computed.

When the answer is Yes in step 601, the procedure proceeds to step 602 in which a determination is made as to whether a sum of the average rich inversion period "ctR (ave)" and the average lean inversion period "ctL (ave)" is greater than the degradation determining value Kct. When the answer is Yes in step 602, the procedure proceeds to step 606 in which the computer determines that inversion period of the output of the air-fuel ratio sensor 25 is faulty.

When the answer is No in step 602, the procedure proceeds to step 603 in which a determination is made as to whether the average rich-side time constant "resR (ave)" is greater than the degradation determining value KresR1 and whether the average lean-side time constant "resL (ave)" is greater than the degradation determining value KresL1.

When the answer is Yes in step 603, the procedure proceeds to step 607 in which the rich-side time constant is faulty or the lean-side time constant is faulty.

When the answer is No in step 603, the procedure proceeds to step 604 in which a determination is made as to whether the average rich-side time delay "dtR (ave)" is greater than the degradation determining value KdtR, and whether the average lean-side time delay "dtL (ave)" is greater than the degradation determining value KdtL.

When the answer is No in step 604, the procedure proceeds to step 609 in which the computer determines that the air-fuel sensor 25 has no degradation.

When the answer is Yes in step 604, the procedure proceeds to step 605 in which a determination is made as to whether the average rich-side time constant "resR (ave)" is smaller than the degradation determining value KresR2, and whether the average lean-side time constant "resL (ave)" is smaller than the degradation determining value KresL2. The degradation determining vales KresR2 and KresL2 are respectively set to values which are smaller than the degradation determining value KresR1 and KresL1.

When the answer is Yes in step 605, the procedure proceeds to step 608. When the average rich-side time delay "dtR (ave)" is greater than the degradation determining value KdtR, the computer determines the rich-side time delay of the air-fuel sensor 25 is faulty in step 608. When the average lean-side time delay "dtL (ave)" is greater than the degradation determining value KtdL, the computer determines the lean-side time delay is faulty in step 608.

When the answer is No in step 605, the procedure proceeds to step 609 in which the computer determines that the air-fuel sensor 25 has no degradation.

[Correction of Target Air-Fuel Ratio for Diagnosis]

Figure 12:
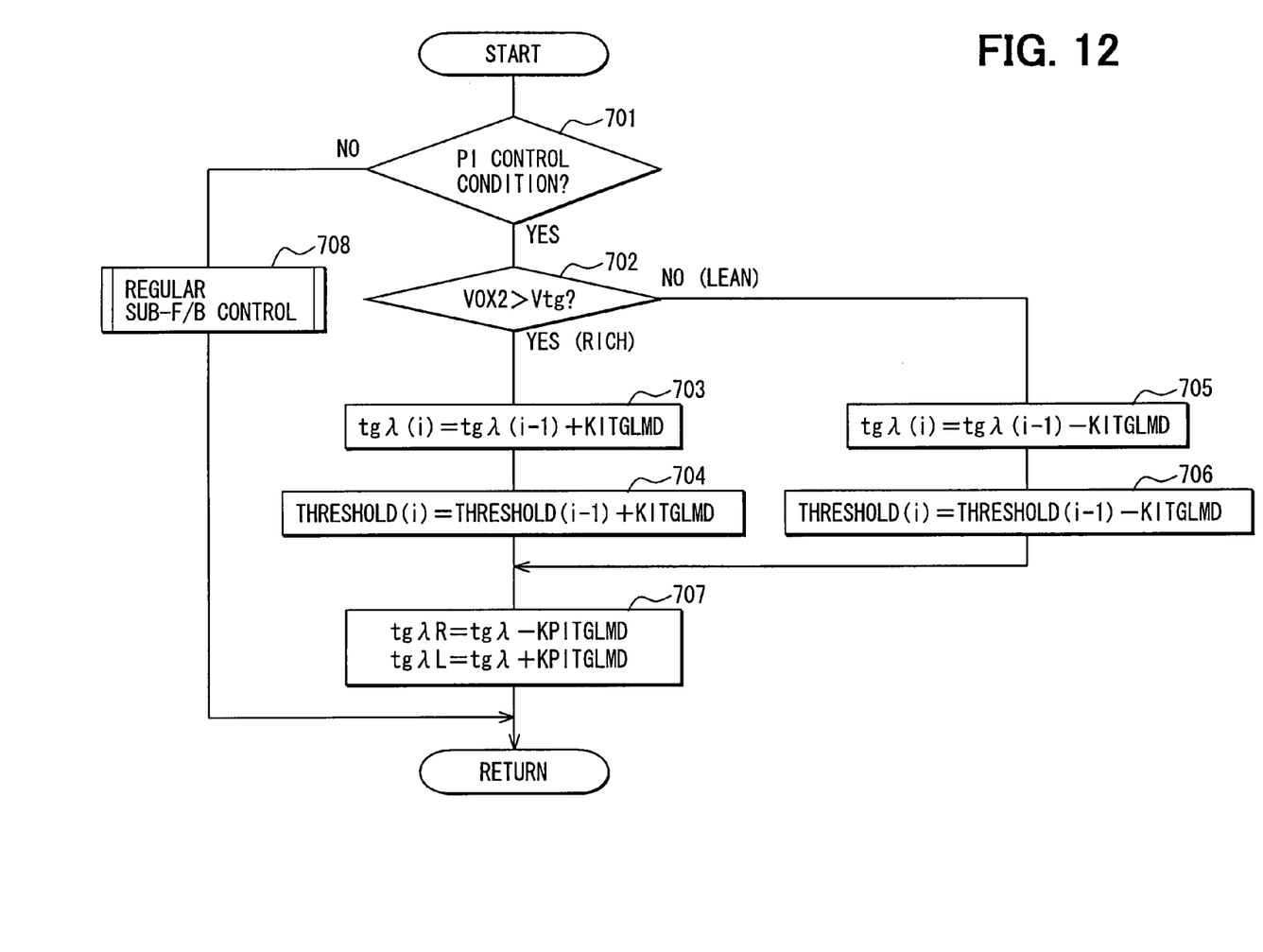
FIG. 12 is a flowchart showing a target air-fuel ratio correction program.

A program shown in FIG. 12 is executed every predetermined period (for example, every five microseconds). In step 701, a determination is made as to whether the PI control execution condition is established. When the answer is No in step 701, the procedure proceeds to step 708 in which the regular sub-feedback control is conducted to correct the target air-fuel ratio in such a manner that the air-fuel ratio of the exhaust gas is within the purifying window of the catalyst 24. The process in step 708 corresponds to the target air-fuel ratio correction means.

When the answer is Yes in step 701, the procedure proceeds to step 702 in which a determination is made as to whether the air-fuel ratio of the exhaust gas flowing through the catalyst 24 is rich or lean based on whether output voltage VOX2 of the oxygen sensor 26 is higher than a target voltage Vtg.

When the answer is Yes in step 702, the procedure proceeds to step 703 in which the center value "tgλ" of the target air-fuel ratio is corrected in lean direction by a predetermined value KITGLMD.

$$tg\lambda(i)=tg\lambda(i-1)+KITGLMD$$

Then, the procedure proceeds to step 704 in which each threshold (LR1, LR2, LR, RL1, RL2, RL) is corrected in lean direction by the predetermined value KITGLMD.

When the answer is No in step 702, the procedure proceeds to step 705 in which the center value "tgλ" is corrected in rich direction by the predetermined value KITGLMD $$tg\lambda(i)=tg\lambda(i-1)-KITGLMD$$

Then, the procedure proceeds to step 706 in which each threshold (LR1, LR2, LR, RL1, RL2, RL) is corrected in rich direction by the predetermined value KITGLMD.

The predetermined value KITGLMD is determined in such a manner that the correction amount of the target air-fuel ratio under the PI control is smaller than the correction amount under the regular air-fuel ratio control. Alternatively, the value KITGLMD may be determined in the same way by extending the correction period of the target air-fuel ratio.

Then, the procedure proceeds to step 707 in which the rich-side target air-fuel ratio "tgλR" is derived by detracting a predetermined value KPITGLMD from the center value "tgλ", and the lean-side target air-fuel ratio "tgλL" is derived by adding the value KPITGLMD to the center value "tgλ".

$$tg\lambda R=tg\lambda-KPITGLMD$$

$$tg\lambda R=tg\lambda+KPITGLMD$$

As described above, the target air-fuel ratio is corrected in such a manner as to be in the purifying window of the catalyst 24.

According to the above embodiment, since the time constant "res" and the delay time "dt" are detected under the condition in which the detected air-fuel ratio "sgλ" is periodically varied by the PI control, the time constant "res" and the time delay "dt" can be accurately detected. Furthermore, the diagnosis of the sensor 25 is conducted based on the time constant "res" and the time delay "dt", a degradation of time constant and a degradation of the time delay are independently diagnosed to enhance the accuracy of the diagnosis.

In the above embodiment, the target air-fuel ratio is turned into the lean-side target air-fuel ratio "tgλL" when the detected air-fuel ratio "sgλ" becomes richer than the rich-side target air-fuel ratio "tgλR" during the P1 control, and the target air-fuel ratio is turned into the rich-side target air-fuel ratio "tgλR" when the detected air-fuel ratio "sgλ" becomes leaner than the lean-side target air-fuel ratio "tgλL" during the P1 control. Thus, the detected air-fuel ratio "sgλ" is varied in a wide range to enhance a detecting accuracy of the time constant "res" and the time delay "dt".

In the above embodiment, the time period from the time when the air-fuel ratio correction amount CFB is corrected by the skip amount KPCFB to the time when the detected air fuel ratio "sgλ" exceeds the predetermined threshold is detected as the time delay "dt". The determination as to whether the detected air-fuel ratio "sgλ" exceeds the threshold can be easily conducted compared with a determination of the extrernal value of the detected air-fuel ratio "sgλ". Thus, the time delay "dt" can be easily and accurately detected.

According to the above embodiment, a variation speed of the actual air-fuel ratio can be increased by increasing the skip amount KPCFB, while the variation range of the target air-fuel ratio is restricted in an extend in which a deterioration of emission is restricted. Thus, a detection accuracy of the time constant "res" and the time delay "dt" is enhanced.

Meanwhile, the regular air-fuel ratio control is not conducted during the P1 control, so that the air-fuel ratio of the exhaust gas is possibly out of the purifying window of the catalyst 24. In the present embodiment, the target air-fuel ratio is corrected based on the output signal of the oxygen sensor 26 during the PI control, so that the emission during the PI control is enhanced.

Furthermore, according to the above embodiment, a dispersion of the detected air-fuel ratio "sgλ" is decreased in order to reduce dispersion of the time constant "res" and the time delay "dt".

In the above embodiment, the rich-side time constant, the lean-side time constant, the rich-side time delay, and the lean-side time delay are diagnosed. Alternatively, at least one of them may be diagnosed.

The oxygen sensor 26 may be replace by an air-fuel sensor which linearly detects the air-fuel ratio of the exhaust gas.

What is claimed is:

1. A system for diagnosing degradation of an air-fuel ratio sensor disposed in an exhaust passage of an internal combustion engine, the system comprising:
   a diagnosis air-fuel ratio control means for conducting a diagnosis air-fuel control in which an air-fuel ratio correcting amount is corrected in a direction away from a diagnosis target air-fuel ratio for diagnosis by a predetermined skip amount which is greater than a predetermined integral amount when a detected air fuel ratio is corrected toward the diagnosis target air-fuel ratio by the predetermined integral amount to exceed the diagnosis target air-fuel ratio;
   a time constant computing means for computing a time constant of the air-fuel ratio sensor based on the detected air-fuel ratio during the diagnosis air-fuel control;
   a time delay computing means for computing a time delay of the air-fuel ratio sensor based on the detected air-fuel ratio during the diagnosis air-fuel control; and
   a diagnosis means for diagnosing at least one of a rich-side time constant degradation, a lean-side time constant degradation, a rich-side time delay degradation, and a lean-side time delay degradation of the air-fuel ratio sensor based on a time constant information computed by the time constant computing means and a time delay information computed by the time delay computing means.

2. A system for diagnosing degradation of an air-fuel ratio sensor according to claim 1, wherein
   the diagnosis air-fuel ratio control means switches the target air-fuel ratio between a lean-side target air-fuel ratio and a rich-side target air-fuel ratio every when the detected air-fuel ratio exceeds the diagnosis target air fuel ratio during the diagnosis air-fuel ratio control.

3. A system for diagnosing degradation of an air-fuel ratio sensor according to claim 1, wherein
   the time constant computing means computes a time period which is required for the detected air-fuel ratio to pass through a predetermined range during the diagnosis air-fuel ratio control, the time period being defined as the time constant information.

4. A system for diagnosing degradation of an air-fuel ratio sensor according to claim 1, wherein
   the time delay computing means, during the diagnosis air-fuel ratio control, computes a time period from a time when the air-fuel ratio correcting amount is corrected in a reverse direction by the predetermined skip amount until a time when the detected air-fuel ratio begins to be varied in the reverse direction, the time period being defined as the time delay information.

5. A system for diagnosing degradation of an air-fuel ratio sensor according to claim 1, wherein
   the time delay computing means, during the diagnosis air-fuel ratio control, computes a time period from a time when the air-fuel ratio correcting amount is corrected in a reverse direction by the predetermined skip amount until a time when the detected air-fuel ratio exceeds a predetermined threshold, the time period being defined as the time delay information.

6. A system for diagnosing degradation of an air-fuel ratio sensor according to claim 1, further comprising
   an inversion period computing means for computing a time period from a time when the air-fuel ratio correcting amount is corrected by the predetermined skip amount until a next time when the air-fuel ratio correcting amount is corrected by the predetermined skip amount during the diagnosis air-fuel ratio control, the time period being defined as an inversion period, wherein
   the diagnosis means diagnoses a degradation of the air-fuel ratio sensor based on the inversion period.

7. A system for diagnosing degradation of an air-fuel ratio sensor according to claim 1, wherein
   the diagnosis air-fuel ratio control means makes a first variation rate lager than a second variation rate, the first variation rate at which the air-fuel ratio correction amount is corrected by the predetermined step amount, the second variation rate at which the diagnosis target air-fuel ratio is switched between a lean-side target air-fuel ratio and a rich-side target air-fuel ratio.

8. A system for diagnosing degradation of an air-fuel ratio sensor according to claim 1, wherein
   the air-fuel ratio sensor is disposed upstream of a catalyst for purifying an exhaust gas, and a downstream air-fuel ratio sensor is disposed downstream of the catalyst, and further comprising a diagnosis target air-fuel ratio correcting means for correcting the diagnosis target air-fuel ratio based on an output of the downstream air-fuel ratio sensor during the diagnosis air-fuel ratio control.

9. A system for diagnosing degradation of an air-fuel ratio sensor according to claim 8, further comprising a target air-fuel ratio correction means for correcting a target air-fuel ratio during a regular air-fuel ratio control in which the air-fuel ratio correction amount is computed in such a manner that the detected air-fuel ratio of the upstream air-fuel ratio sensor is brought into consistence with the target air-fuel ratio, wherein the diagnosis target air-fuel ratio correction means makes a first correction amount smaller than a second correction amount, the first correction amount by which the diagnosis air-fuel ratio target ratio is corrected during a diagnosis air-fuel ratio control, the second correction amount by which the target air fuel ratio is corrected during a regular air-fuel ratio control.

10. A system for diagnosing degradation including an upstream air-fuel ratio sensor disposed upstream of a catalyst for purifying an exhaust gas of an internal combustion engine and a downstream air-fuel ratio sensor disposed downstream of the catalyst, the system diagnosing a degradation of the upstream air-fuel ratio sensor, the system comprising:

a diagnosis air-fuel ratio control means for conducting a diagnosis air-fuel control in which an air-fuel ratio correcting amount is corrected in a direction away from a diagnosis target air-fuel ratio by a predetermined skip amount which is greater than a predetermined integral amount when a detected air fuel ratio of the upstream air-fuel ratio sensor is corrected toward the target air-fuel ratio by the predetermined integral amount to exceed the diagnosis target air-fuel ratio;

a diagnosis means for diagnosing a degradation of the upstream air-fuel ratio sensor during a diagnosis air-fuel ratio control, and a diagnosis target air-fuel ratio correction means for correcting the diagnosis target air-fuel ratio based on an output of the downstream air-fuel ratio sensor.

* * * * *